(12) United States Patent
Holler et al.

(10) Patent No.: US 8,961,642 B2
(45) Date of Patent: Feb. 24, 2015

(54) FILTER DEVICE AND METHOD FOR SEPARATING PAINT OVERSPRAY

(71) Applicant: Dürr Systems GmbH, Bietigheim-Bissingen (DE)

(72) Inventors: Sebastian Holler, Korntal-Münchingen (DE); Jürgen Steinbach, Hemmingen (DE); Katharina Hess, Stuttgart (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/800,882

(22) Filed: Mar. 13, 2013

(65) Prior Publication Data

US 2013/0186049 A1    Jul. 25, 2013

Related U.S. Application Data

(63) Continuation of application No. PCT/EP2011/065937, filed on Sep. 14, 2011.

(30) Foreign Application Priority Data

Sep. 28, 2010    (DE) .......................... 10 2010 041 552

(51) Int. Cl.
*B01D 46/00*    (2006.01)
*B01D 46/44*    (2006.01)
(Continued)

(52) U.S. Cl.
CPC ........ *B01D 46/0023* (2013.01); *B01D 46/0002* (2013.01); *B01D 46/0005* (2013.01);
(Continued)

(58) Field of Classification Search
CPC ........... B01D 46/0002; B01D 46/0004; B01D 46/0005; B01D 46/0023; B01D 46/0084; B01D 46/0086; B01D 46/442; B01D 46/444; B01D 46/446
USPC ........... 55/318, 323, 326, 327, 328, 332, 334, 55/385.2, 422, 482, 485, 486, 487, 489, 55/511, 478, DIG. 12; 95/273, 285, 286, 95/287; 96/18, 57, 417, 421, 422
See application file for complete search history.

(56) References Cited

U.S. PATENT DOCUMENTS 3,973,935 A * 8/1976 Moore et al. .................... 55/302
4,787,922 A   11/1988 Kulitz
(Continued)

FOREIGN PATENT DOCUMENTS

CA    2697442    3/2009
DE    3722693    5/1988
(Continued)

*Primary Examiner* — Robert Clemente
(74) *Attorney, Agent, or Firm* — Womble Carlyle Sandridge & Rice, LLP (57) ABSTRACT

A filter device for separating paint overspray from a raw gas flow containing overspray particles is provided, including at least one filter element, to which at least a part of the raw gas flow is feedable, and a clean gas chamber, to which the raw gas flow filtered by the filter element is feedable as a clean gas flow. In the event of a filter rupture at at least one filter element of the filter device, contamination of the clean gas side of the filter device and regions downstream of the filter device of a painting installation containing the filter device is kept as low as possible through use of at least one safety filter arranged downstream of the at least one filter element and associated with the clean gas chamber such that at least part of the clean gas flow is filterable in the event of a filter rupture.

14 Claims, 7 Drawing Sheets

(51) Int. Cl.
  *B01D 46/42* (2006.01)
  *B05B 15/12* (2006.01)

(52) U.S. Cl.
  CPC ........ *B01D46/0004* (2013.01); *B01D 46/0086* (2013.01); *B01D 46/442* (2013.01); *B01D 46/444* (2013.01); *B01D 46/446* (2013.01); *B01D 46/0095* (2013.01); *B01D 46/42* (2013.01); *B05B 15/1255* (2013.01); *Y10S 55/46* (2013.01)
  USPC ............. 55/482; 55/318; 55/323; 55/328; 55/385.2; 55/422; 55/DIG. 46; 95/285; 95/287; 96/18; 96/57; 96/417; 96/421; 96/422

(56) References Cited

U.S. PATENT DOCUMENTS

| | | | |
|---|---|---|---|
| 5,147,427 A * | 9/1992 | Abbot et al. | 55/302 |
| 5,271,750 A | 12/1993 | Abbott et al. | |
| 5,505,763 A * | 4/1996 | Reighard et al. | 95/19 |
| 5,593,470 A * | 1/1997 | Shagott et al. | 96/418 |
| 5,607,498 A * | 3/1997 | Reighard et al. | 95/19 |
| 6,024,796 A | 2/2000 | Salazar et al. | |
| 6,887,293 B1 | 5/2005 | Abad et al. | |
| 7,189,272 B2 * | 3/2007 | Cheng | 55/385.2 |
| 7,959,722 B2 * | 6/2011 | Wieland et al. | 96/372 |
| 7,988,769 B2 * | 8/2011 | Wieland et al. | 95/267 |
| 8,241,406 B2 * | 8/2012 | Weschke | 95/278 |
| 8,377,177 B2 * | 2/2013 | Holzheimer et al. | 95/285 |
| 8,535,420 B2 * | 9/2013 | Holler et al. | 95/273 |
| 2008/0229926 A1* | 9/2008 | Wieland et al. | 95/278 |
| 2009/0209188 A1* | 8/2009 | Wieland et al. | 454/54 |
| 2010/0199912 A1* | 8/2010 | Holzheimer et al. | 118/326 |
| 2011/0262324 A1* | 10/2011 | Fritz et al. | 423/210 |
| 2012/0266812 A1* | 10/2012 | Iwakiri | 118/326 |

FOREIGN PATENT DOCUMENTS

| | | |
|---|---|---|
| DE | 4211465 | 10/1993 |
| DE | 10058086 | 6/2002 |
| EP | 1704925 | 9/2006 |
| WO | WO 2004/024341 | 3/2004 |

* cited by examiner

FILTER DEVICE AND METHOD FOR SEPARATING PAINT OVERSPRAY

CROSS-REFERENCE TO RELATED APPLICATIONS

The present application is a continuation of international application number PCT/EP2011/065937 filed on Sep. 14, 2011, which claims priority to German patent application number 10 2010 041 552.9 filed Sep. 28, 2010, the entire specification of both being incorporated herein by reference.

FIELD OF DISCLOSURE

The present invention relates to a filter device for separating paint overspray from a raw gas flow containing overspray particles, the filter device comprising at least one filter element, to which at least a part of the raw gas flow is feedable, and a clean gas chamber, to which the raw gas flow filtered by means of the filter element is feedable as a clean gas flow.

BACKGROUND OF THE INVENTION

A device of this type is known, for example from DE 10 2007 040 901 A1.

If a filter element of a filter device of this type is mechanically damaged, so that the unfiltered raw gas flow arrives on the clean gas side of the filter device at one or more locations, the clean gas side of the filter device and the regions of a painting installation containing the filter device, which are located downstream of the filter device, are contaminated by the dirt particles that have not been filtered out from the raw gas flow (in particular overspray particles and if applicable particles of an auxiliary filter material).

SUMMARY OF THE INVENTION

The present invention is based on the object of keeping the contamination of the clean gas side of the filter device and a painting installation containing the filter device as low as possible in the event of a filter rupture at at least one filter element of the filter device.

This object is achieved according to the invention in a filter device having the features of the preamble of claim 1 in that there is associated with the clean gas chamber of the filter device, at least one safety filter, which is arranged downstream of the at least one filter element and by means of which at least a part of the raw gas flow is filterable in the event of a filter rupture at at least one filter element of the filter device.

The present invention is based on the concept, in the event of a filter rupture, of locally capturing material that has passed through the main filter, which is formed by the at least one filter element of the filter device, so that system parts arranged downstream of the clean gas chamber in the flow path of the clean gas flow, in particular fans, sensors and air conditioning devices (for example coolers and/or humidifiers), are protected from contamination in the event of a filter rupture.

In order to keep the distance, which the unfiltered raw gas covers in the event of a filter rupture on the clean gas side of the filter device up to the safety filter, as short as possible, it is favorable if the safety filter is integrated into the clean gas chamber of the filter device.

In particular, it may be provided that at least one safety filter is arranged inside the clean gas chamber or on a delimiting wall of the clean gas chamber.

The clean gas chamber may, for example, be configured as a clean gas box, in particular a substantially cuboidal clean gas box.

The at least one filter element of the main filter preferably comprises a filter membrane, which is used to separate paint overspray from the raw gas flow. Damage to the filter membrane, which allows raw gas flow containing overspray particles to pass unfiltered through the filter element, represents a filter rupture at the particular filter element.

The filter device preferably comprises a main filter, which comprises at least one filter element configured as a dry filter, in other words a filter, with which dry filtration is configured to be carried out. Dry filtration is filtration of the gas flow, which passes through the filter and takes place without washing with a cleaning liquid. This does not rule out a layer, which is formed in the course of the filtration on the filter, of material to be filtered out and if applicable auxiliary filter material being washed off by applying a liquid cleaning medium.

The main filter preferably exclusively comprises dry filters.

If the filter device comprises a main filter with a plurality of filter elements, it is preferably provided that the clean gas chamber receives the clean gas flows from a plurality of, in particular from all, the filter elements of the filter device.

It is furthermore preferably provided that at least one filter element is held on the clean gas chamber of the filter device.

For this purpose, the clean gas chamber may comprise a filter element receiver with at least one filter element holder and preferably with a receiving opening for the filter elements to pass into a filter element receiver of the filter device.

If the filter device according to the invention forms a component of a device for separating paint overspray from a raw gas flow containing overspray particles, which comprises a plurality of such filter devices, it is advantageous if the filter device comprises a clean gas channel, through which clean gas is feedable from the clean gas chamber of the filter device to a clean gas collecting channel, the clean gas collecting channel also receiving the clean gas of at least one other filter device and feeding it to downstream system parts, for example a blower and/or an air conditioning device (in particular a cooler and/or a humidifier).

In order, in a case such as this, to keep contamination of the clean gas collecting channel and of the components of the painting installation arranged downstream of the clean gas collecting channel as small as possible, it is favorable if the safety filter of the filter device is arranged upstream of a junction of the clean gas channel into the clean gas collecting channel.

All the filter devices of the device to separate paint overspray from a raw gas flow containing overspray particles are preferably provided with a safety filter of the type which is arranged upstream of the junction of the respective clean gas channel of the relevant filter device into the clean gas collecting channel.

This ensures that each safety filter associated with a filter device of this type only has to filter the fraction of the raw gas flow passing through the particular filter device in the event of a filter rupture at the particular filter device.

As a result, the safety filter of each filter device can be kept relatively small.

Each of the plurality of filter devices of the device for separating paint overspray from the raw gas flow containing overspray particles preferably has its own inlet channel, through which a respective fraction of the raw gas flow is feedable to the respective filter device.

The fractions of the raw gas flow, which are fed to the various filter devices, are preferably substantially the same size as one another, so that the safety filters associated with these filter devices, because of the substantially uniform volume flow through the various filter devices, can also be made substantially the same size and therefore the size of the safety filters can be standardized.

As a result, the same type of safety filter with the same safety filter elements can preferably be used for all the filter devices of the filter device for separating paint overspray from the raw gas flow containing overspray particles.

In a preferred configuration of the invention it is provided that at least one safety filter is arranged on the filter device in such a way that at least one filter element is removable from the filter device, without removing the safety filter beforehand. This ensures that, owing to the integration of the safety filter on the filter device, the assembly and disassembly as well as the maintenance and repair of the filter elements of the filter device is not made more difficult.

All the safety filters of the filter device are preferably arranged on the filter device in such a way that all the filter elements are removable from the filter device, without removing one of the safety filters beforehand.

Basically, there can be used as a safety filter any type of filter element, which is suitable to filter out the particles entrained in the raw gas flow and which withstands the volume flow guided in the event of a filter rupture through the safety filter.

The safety filter preferably comprises at least one dry filter, in other words a filter, with which a dry filtration is configured to be carried out. A dry filtration is a filtration of the gas flow, which passes through the filter and takes place without washing with a cleaning liquid. This does not rule out a layer, which is formed in the course of the filtration on the filter, of material to be filtered out and optionally auxiliary filter material being washed off by applying a cleaning liquid medium.

The safety filter preferably exclusively comprises dry filters.

A dry filtration provides the advantage that the temperature and the humidity of the gas flow, which flows through the filter, remain approximately constant here, so that the gas flow passing through the filter does not additionally need to be conditioned with regard to its temperature and/or its humidity after passing through the filter.

The safety filter may, for example, comprise a baffle filter, a pocket filter, a bag filter, a mat filter, a plate filter and/or a tube filter.

The safety filter may be permanently arranged in the flow path of the clean gas flow and be active for filtering the gas flow passing through the safety filter.

As an alternative or in addition, it may be provided for this purpose that at least one safety filter is activatable in the event of a filter rupture at a filter element for the filtration of raw gas arriving through the filter element. This provides the advantage that the particular safety filter does not filter the clean gas already filtered by the filter elements of the main filter again, but is only activated or switched on in the event of a filter rupture at at least one of the filter elements of the filter device for the filtration then becoming necessary of the raw gas arriving through the main filter. As a result, an unnecessary increase in the flow resistance on the clean gas side of the filter device is avoided in the normal operating state of the filter device.

An activation of this type of a safety filter in the event of a filter rupture may, for example, take place in that at least one safety filter comprises at least one safety filter element, which, in the normal operating state of the filter device, is arranged in a standby position outside the flow path of the clean gas and, by means of suitable movement device, can be brought into a working position in the flow path of the raw gas arriving through the main filter of the filter device in the event of a filter rupture.

The movement device preferably has a motor drive for the movement of the at least one safety filter element.

Safety filter elements, which can be brought into the flow path by means of a mechanical movement device in the event of a filter rupture may, for example, be configured as a filter plate, a pocket filter or a baffle filter.

As an alternative or in addition to this, the safety filter may also be activatable in that it comprises at least one safety filter element, which is substantially permeable to the filtered clean gas in the normal operating state of the filter device and is only (preferably automatically) filled with a suitable filter material in the event of a filter rupture.

For example, a safety filter element of this type may comprise a filter material receiver, in particular in the form of a net or grid, which is filled with filter material from a filter material reservoir, for example with a fill of filter material particles, in the event of a filter rupture.

A suitable filter material for filling a safety filter element of this type in the event of a filter rupture is, for example, gravel, sand, iron cuttings or the like.

As an alternative or in addition to this, a safety filter may also be activatable in the event of a filter rupture in that it comprises at least one safety filter element, which is activatable by applying an electric voltage in the event of a filter rupture.

A safety filter element of this type may, in particular, be configured as an electrostatic filter.

In order to be able to activate the safety filter in time when using a safety filter only activatable in the case of damage or, in the case of a permanently active safety filter, to be able to alert the operating staff of the painting installation and/or to be able to determine over what time period the safety filter is loaded with raw gas arriving on the clean gas side of the filter device, it is advantageous if the filter device comprises at least one detection device for detecting a filter rupture at a filter element.

A detection device of this type may, for example, comprise a particle counter, a pressure loss measuring device, a filter resistance measuring device to measure the flow resistance of at least one filter element of the main filter and/or a filter resistance measuring device for measuring the flow resistance of at least one safety filter.

In a preferred configuration of the invention it is furthermore provided that an auxiliary filter material is used to filter the raw gas flow and that at least one filter element of the filter device is provided, during operation of the filter device, with a barrier layer, which contains an auxiliary filter material.

As a result, in particular when using a fluid paint, the moist fluid paint overspray is prevented from arriving directly on the surface of the filter element. Rather, the fluid paint overspray is bound by the auxiliary filter material and/or the auxiliary filter material forms a barrier layer between the wet fluid paint overspray and the filter surface.

The term "fluid paint" is this description—in contrast to the term "powder paint"—designates a paint with a flowable consistency, from liquid to pasty (for example in the case of a PVC paint). The term "fluid paint" in particular comprises the terms "liquid paint" and "wet paint".

Lime, rock powder, an aluminum silicate, an aluminum oxide, a silicon oxide, powder paint or the like, in particular, are possibilities as auxiliary filter material.

The present invention furthermore relates to a method for separating paint overspray from a raw gas flow containing overspray particles, which comprises the following method steps:

feeding at least a part of the raw gas flow to at least one filter element, by means of which the raw gas flow that is fed is filtered; and feeding the raw gas flow filtered by means of the filter element as a clean gas flow to a clean gas chamber.

The present invention is based on the further object of providing a method of this type for separating paint overspray from a raw gas flow containing overspray particles, in which, in the event of a filter rupture at at least one filter element of the filter device, contamination of the clean gas side of the filter device and the regions located downstream of the filter device of a painting installation containing the filter device is kept as small as possible.

This object is achieved according to the invention in a method for separating paint overspray from a raw gas flow containing overspray particles in that in the event of a filter rupture at at least one filter element, the raw gas flow fed to the clean gas chamber is filtered by means of a safety filter arranged downstream of the filter element and associated with the clean gas chamber.

The filter device according to the invention is suitable, in particular, for carrying out the method according to the invention for separating paint overspray from a raw gas flow containing overspray particles.

The length of the section of the gas flow path, which is contaminated in the event of a filter rupture, between the clean gas chamber and the safety filter is minimized by the filter device according to invention and the method according to the invention.

Preferably, no machine parts that could be contaminated in the event of a filter rupture are arranged between the filter element of the main filter and the safety filter.

The safety filter, which is associated with the clean gas chamber of an individual filter device, may have a smaller size than a safety filter, which would be arranged in a clean gas collecting channel or in a collecting circulating air channel.

The safety filter allows a safe dry deposition of particles from the raw gas in the event of a filter rupture with only a small additional space requirement.

When converting an existing painting installation, the safety filter associated with the clean gas chamber of an individual filter device can easily be added; there is no additional space requirement as a result for a safety filter in a clean gas collecting channel or in a collecting circulating air channel.

The safety filter may be positioned in any conceivable position after the filter receiver. In particular, it may also be arranged in the clean gas chamber, over the clean gas chamber, under the clean gas chamber or horizontally after the clean gas chamber.

The safety filter may be arranged in such a way that it does not impair the disassembly of the filter elements of the main filter of the filter device.

A correspondingly formed receiver of the safety filter allows easy installation and disassembly of the safety filter and easy accessibility of the safety filter for maintenance purposes.

This may, for example, be made possible in that the safety filter is withdrawable out of a frame perpendicular to the inflow direction.

As an alternative or in addition to this, it may also be provided that the safety filter is withdrawable together with the frame out of the flow path of the gas flow, in particular from a channel assembly.

The safety filter may, for example, comprise an F5 pocket filter.

The safety filter may be equipped with a monitoring device, which records when the safety filter, for example, has a higher contact resistance. A filter break can thus be indirectly recorded, as the flow resistance of the safety filter increases when particles from the raw gas arriving on the clean gas side of the filter device in the event of a filter rupture are deposited on the safety filter.

A filter covering detection on the safety filter may also be combined with a particle emission measurement; a rupture at the main filter of the filter device can thus be recognized early.

A particle emission measurement may also be used independently, in other words without an additional filter resistance measurement, to detect a filter rupture.

The safety filter may be permanently active or activatable in the event of a rupture at the main filter of the filter device.

The detection of damage at the main filter may, for example, be detected by a particle counter, by a change in the pressure loss across the main filter and/or by changes in the resistance of the filter elements of the main filter when being cleaned by means of compressed air.

Upon detection of a filter rupture, the safety filter stage may be switched on. This minimizes the necessary pressure loss during normal operation of the filter device and simultaneously ensures the necessary safety against contamination in the event of a filter rupture.

The safety filter of the filter device according to the invention is arranged locally to the filter elements of the main filter.

No further clean gas flows are preferably added between the main filter and the safety filter associated with the main filter, so the safety filter only has to be matched to the part gas flow which passes through the respectively associated filter device.

The gas channel distance between the rupture point and the safety filter, which is contaminated by particles from the raw gas flow in the event of a filter rupture, is kept small in that the safety filter is arranged adjacent to the at least one filter element of the main filter of the filter device.

No fans, sensors or conditioning devices (such as, for example, coolers and/or humidifiers) are preferably arranged in the flow path of the gas flow between the at least one filter element of the main filter and the associated safety filter.

Further features and advantages of the invention are the subject of the following description and the graphical view of embodiments.

BRIEF DESCRIPTION OF THE DRAWINGS

The same or functionally equivalent elements are designated by the same reference numerals in all the Figures.

DETAILED DESCRIPTION OF THE INVENTION

Figure 1:
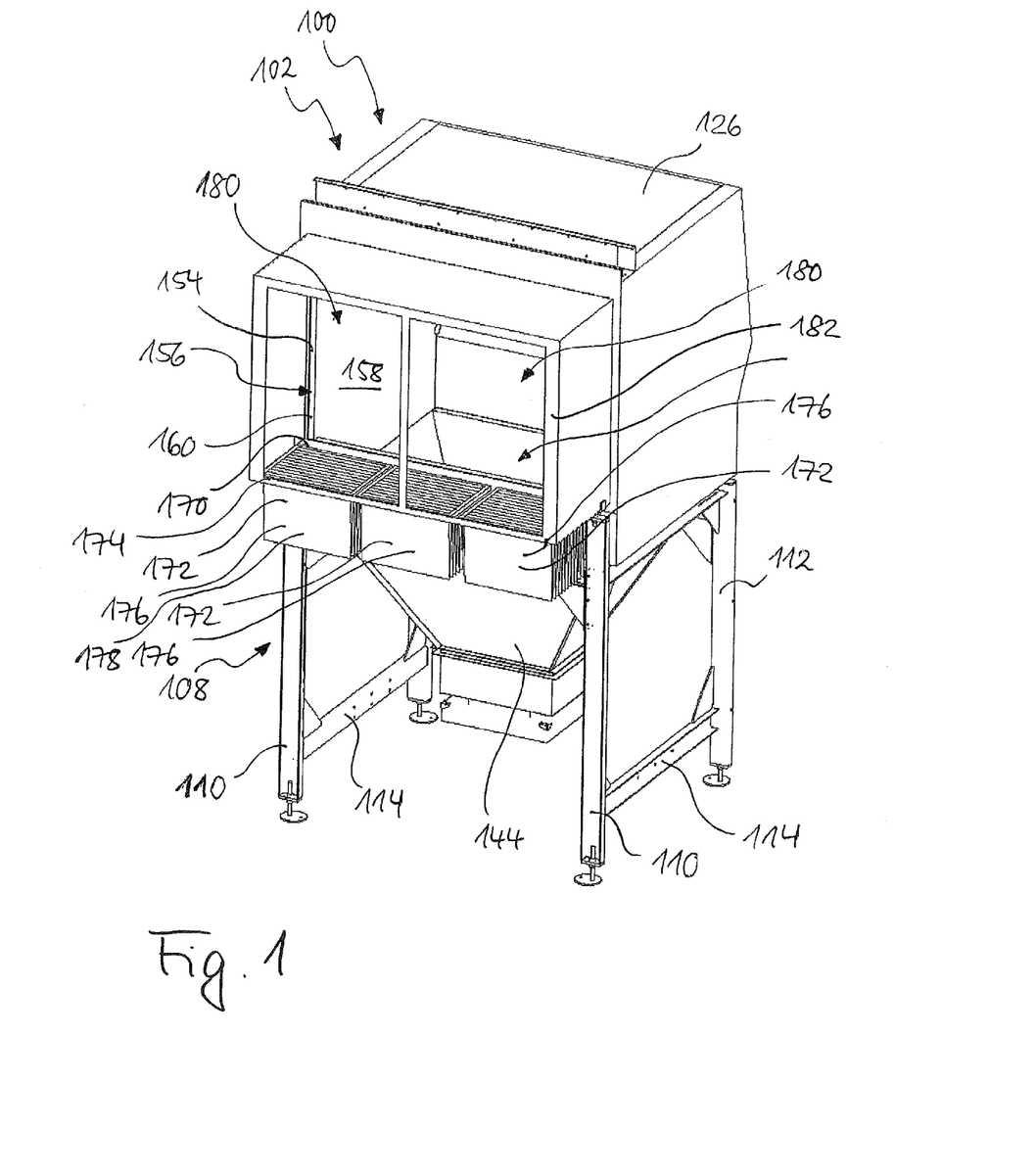
FIG. 1 shows a schematic perspective view of a filter module of a device for separating fluid paint overspray from a raw gas flow containing overspray particles, the filter module comprising a clean gas chamber and a safety filter associated with the clean gas chamber of the filter module.
Figure 2:
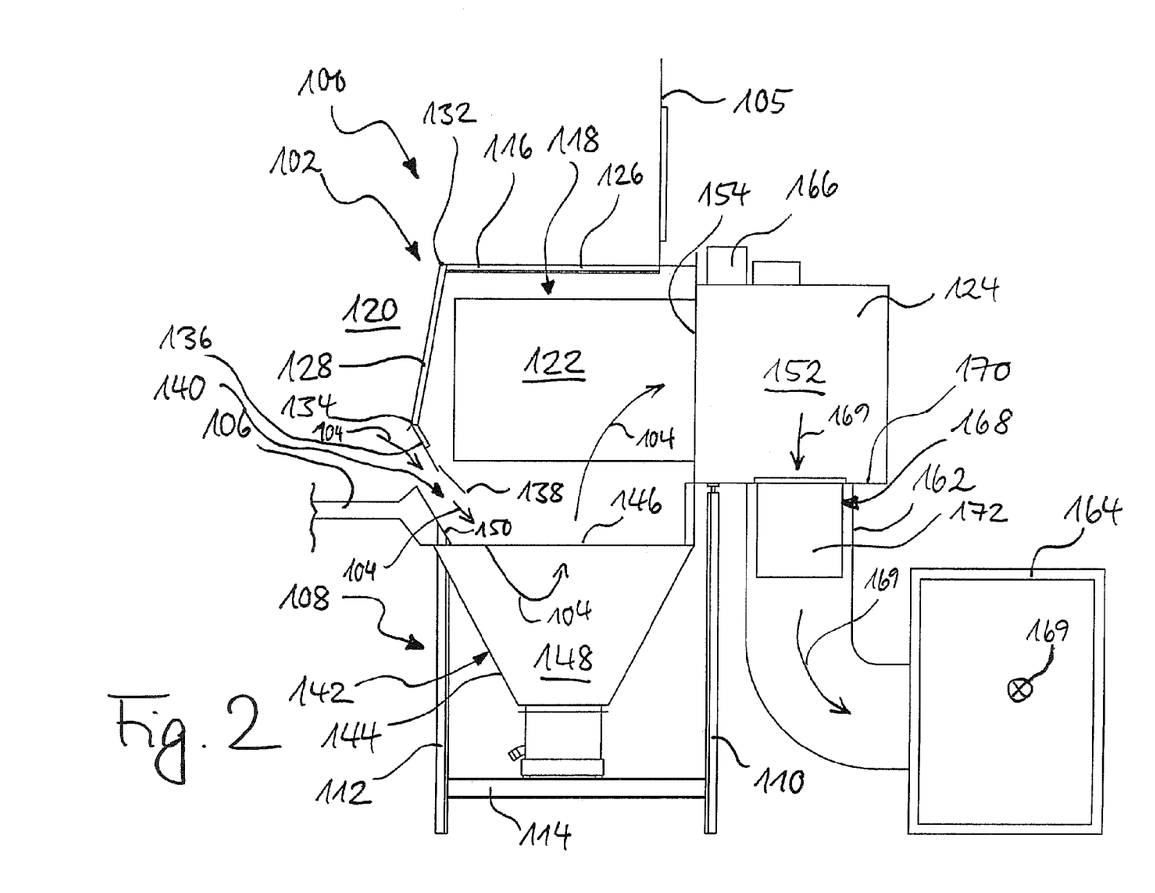
FIG. 2 shows a schematic vertical section through the filter module from FIG. 1 with the safety filter, a clean gas collecting channel and a clean gas channel connecting the clean gas chamber of the filter module to the exhaust gas collecting channel.
Figure 3:
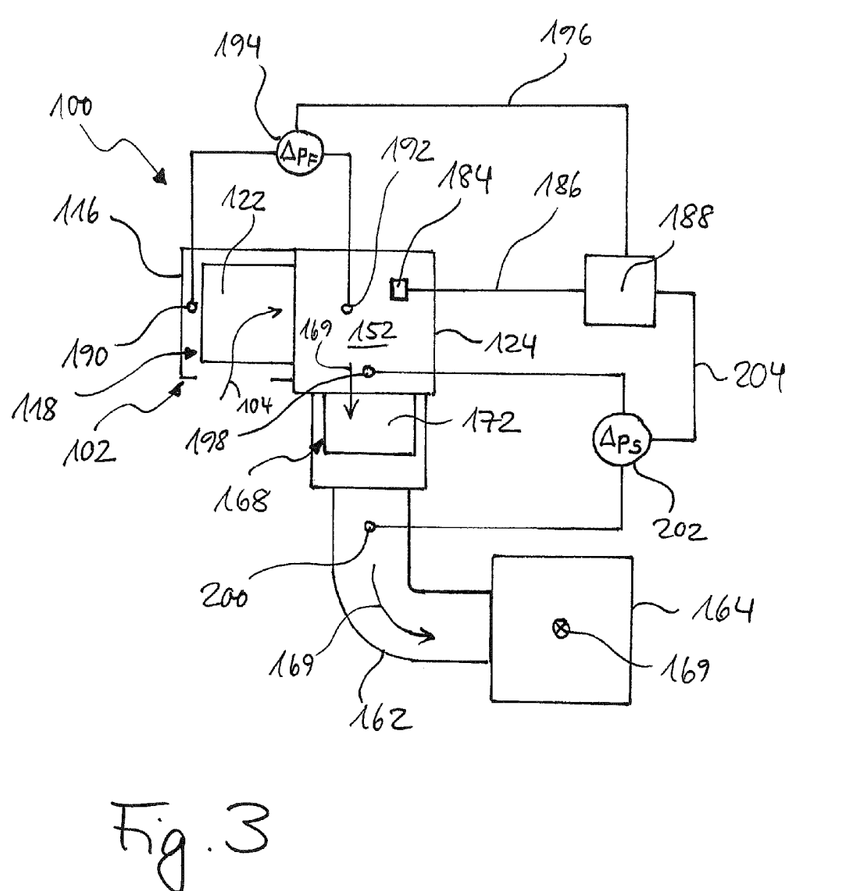
FIG. 3 shows a schematic view of a filter module with a safety filter, the safety filter being permanently arranged in the flow path of the clean gas and a filter rupture being detected at a filter element of the filter module by means of a particle counter and/or by means of pressure difference measurements.

A device designated as a whole by 100 and shown in FIGS. 1 to 3 for separating fluid paint overspray from a raw gas flow comprises one or more filter modules 102, also designated filter devices in the above description, of which one is shown in FIGS. 1 to 3.

The device 100 for separating fluid paint overspray forms a component of a painting installation for spray-painting workpieces, for example vehicle bodies, which are moved through an application region of the painting installation and are painted in the application region by means of spray-painting devices (not shown), for example in the form of painting robots.

An air flow, which permeates the application region and absorbs paint overspray in the form of overspray particles, is produced by means of a circulating air circuit. The term "particles" in this case comprises both solid and liquid particles, in particular droplets.

When using fluid paint, the fluid paint overspray consists of paint droplets. Most of the overspray particles have a largest diameter in the region of about 1 µm to about 100 µm.

The exhaust air flow loaded with the overspray particles from the application region will be designated the raw gas flow 104 below. The flow direction of the raw gas flow is shown in FIGS. 2 and 3 by arrows designated 104.

The raw gas flow 104 arrives from the application region in the device 100 for separating fluid paint overspray from the raw gas flow, which is preferably arranged below the application region.

The filter modules 102 of the device 100 may, in particular, be arranged in two rows of modules on the two mutually opposite sides of a flow chamber, of which one vertical side wall 105 is shown in FIG. 2.

A cat-walk 106, which an operator can walk on, is provided between the two rows of modules (see FIG. 2).

Each of the filter modules 102 is preferably configured as a preassembled unit, which is produced at a site remote from the assembly site of the painting installation and the device 100 for separating fluid paint overspray and is transported as a unit to the assembly site of the painting installation. At the assembly site, the preassembled unit is arranged in the provided working position and connected to one or more adjacent preassembled units and to a support construction of the application region.

Each filter module comprises a support construction 108 made of two vertical rear supports 110 and two vertical front supports 112, which are connected by horizontal transverse webs 114 to one of the rear supports 110, in each case.

Furthermore, the front supports 112 and the rear supports 110 are connected to one another at their upper ends by means of a horizontal transverse web (not shown), in each case.

The filter module 132 furthermore comprises a housing 116, which separates a filter element receiving space 118, which is arranged within the housing 116, of the filter module 102 from a region 120 of the flow chamber located outside the housing 116.

A plurality of filter elements 122, which project in the horizontal direction from a clean gas chamber 124, which is held on the support construction 108, are arranged in the filter element receiving space 118 of the filter module 132.

The filter elements 122 may, for example, be configured as plates made of sintered polyethylene, which are provided on their outer face with a membrane made of polytetrafluoroethylene (PTFE).

The membrane made of PTFE is used to increase the filter class of the filter elements 122 (in other words to reduce their permeability) and, furthermore, to prevent the permanent adhesion of the fluid paint overspray separated from the raw gas flow 104 on the surface of the filter elements 122.

The membrane of the filter elements 122 furthermore preferably contains an electrically conductive component, for example graphite, in order to ensure a conduction of electrostatic charges from the filter elements 122 and antistatic properties of the filter elements 122.

Both the base material of the filter elements 122 and their PTFE membrane have a porosity so that the raw gas can arrive through the pores into the interior of the respective filter element 122 and from there into the clean gas chamber 124.

In order to prevent clogging of the filter surfaces, these are furthermore provided with a barrier layer, which contains auxiliary filter material discharged into the raw gas flow 104. This preferably particulate auxiliary filter material is generally also called "precoat" material.

During operation of the device 100, the barrier layer forms by deposition of the auxiliary filter material, which is discharged into the raw gas flow 104, on the filter surfaces, and prevents the filter surfaces clogging owing to adhering fluid paint overspray.

Basically, any medium can be used as auxiliary filter material that is capable of absorbing the liquid fraction of the fluid paint overspray and to accumulate on overspray particles and therefore to take away their adhesiveness.

In particular, lime, rock powder, an aluminum silicate, an aluminum oxide, a silicon oxide, powder paint or the like are possible auxiliary filter materials, for example.

The auxiliary filter material preferably consists of a large number of auxiliary material particles, which have a mean diameter in the range of, for example, about 10 µm to about 100 µm.

As can be seen from FIG. 2, the housing 116 comprises a substantially horizontal top wall 126 and a front wall 128 extending downwardly from a front edge 132 of the top wall 126.

The front wall 128 of the housing 116 comprises an upper front wall portion 130, which extends from the front edge 132 of the top wall 126 to a front edge 134 of the front wall 128, and a lower front wall portion 136, which extends from the front edge 134 downwardly to a lower front wall edge 138.

The lower front wall portion 136 forms an upper limit of an inlet channel 140 of the filter module 102, through which a part of the raw gas flow 104 enters the relevant filter module 102.

In order to be able to add the auxiliary filter material to the raw gas flow 104, without there being a danger of the auxiliary filter material arriving in the application region of the painting installation, each filter module 102 is provided with an auxiliary filter material receiving container 142, which is held on the support construction 108 and, for example, has a funnel-shaped design in the form of an inverted truncated pyramid (see FIGS. 1 and 2).

The upper edges of the, for example, four trapezoidal side walls 144 of the auxiliary filter material receiving container 142 surround an access opening 146 of the auxiliary filter material receiving container 142, through which the raw gas flow 104 loaded with overspray can enter the auxiliary material receiving container 142 and can escape from it again.

In order to deflect the raw gas flow entering the filter module specifically into the interior 148 of the auxiliary filter material receiving container 142 and to prevent direct access of the raw gas flow from the flow chamber to the filter elements 122, each filter module 102 is provided with the inlet channel 140, which is upwardly delimited by the lower front wall portion 136 of the housing 116 and downwardly delimited by a side wall 150 of the accessible cat-walk 106.

The small inlet cross section and the therefore high flow speed of the raw gas flow 104 in the inlet channel 140 effectively prevent auxiliary filter material arriving from the interior of the filter module 102, which forms a closed box, into the flow chamber and from there into the application region of the painting installation. A swirling of the auxiliary filter material in the auxiliary filter material receiving container 142 and a cleaning of the filter elements 122 can therefore take place at any desired time without the supply of raw gas to the filter module 102 or even the operation of the spray-painting devices in the application region having to be interrupted.

Furthermore, since the raw gas flow 104 leaves the inlet channel 140 while being directed into the auxiliary filter material receiving container 142, it is ensured that there takes place a deflection of the raw gas flow 104 in the interior 148 of the auxiliary filter material receiving container 142. As a result, an adequate quantity of auxiliary filter material, which is produced by the swirling of the auxiliary filter material by means of compressed air pulses from a compressed air lance (not shown) from the provision located in the auxiliary filter material receiving container 142, is entrained by the raw gas flow 104 and carried out of the auxiliary filter material receiving container 142 to the filter elements 102.

The auxiliary filter material entrained by the raw gas flow 104 and the fluid paint overspray entrained by the raw gas flow 104 are deposited on the filter surfaces of the filter elements 122, and the raw gas filtered by means of the filter elements 122 arrives as clean gas through the porous filter surfaces into the interiors of the filter elements 122, which have a fluid connection to the interior 152 of the clean gas chamber 152.

As can best be seen from FIG. 1, in which the filter elements 122 of the filter module 102 are not shown, formed on the front side 154 of the clean gas chamber 124 facing the filter element receiving space 118 of the filter module 102 is a filter element receiver 156, which comprises a receiving opening 158 and a filter element holder 160, so the filter elements 122 can be held on the filter element holder 160 and extend from there through the receiving opening 158 into the filter element receiving space 118.

The filtered clean gas from all the filter elements 122 of the same filter module 102 is collected in the clean gas chamber 124.

As can best be seen from FIG. 2, this collected clean gas arrives through one or more clean gas channels 162 at a clean gas collecting channel 164 arranged outside the flow chamber.

The clean gas channels 162 of the filter modules 102 of one of the two module rows from a plurality of respective filter modules 122, which are arranged on the mutually opposing sides of the flow chamber, open, in each case, into each of the clean gas collecting channels 164 arranged on either side of the flow chamber.

The clean gas cleaned of the fluid paint overspray arrives from the clean gas collecting channels 164 arranged on either side of the flow chamber at an exhaust air blower (not shown), whence the clean gas is fed by way of a cooling stack (not shown) and a feed line (not shown) to an air chamber (not shown) arranged above the application region, the so-called plenum.

From this air chamber, the cleaned exhaust air arrives as clean gas by way of a filter cover back into the application region, so the circulating air circuit through the painting installation is closed.

As the separation of the fluid paint overspray from the raw gas flow 104 by means of the filter elements 122 takes place dry, in other words without washing with a cleaning liquid, the air guided in the circulating air circuit is not moistened during the separation of the fluid paint overspray, so no devices of any kind are required for dehumidifying the air guided in the circulating air circuit. Furthermore, no devices are required either for separating fluid paint overspray from a washing-cleaning liquid.

The filter elements 122 are cleaned at specific time intervals by compressed air pulses when their loading with fluid paint overspray and auxiliary filter material has reached a predetermined amount.

The required compressed air pulses are produced by means of a pulsing unit 166, which is arranged on the clean gas chamber 124 of each filter module 102. The compressed air pulses produced arrive from the interior 152 of the clean gas chamber 124 into the interiors of the filter elements 122 and from there through the porous filter surfaces into the filter element receiving space 118 of the respective filter module 102, the barrier layer, which is formed on the filter surfaces and made of auxiliary filter material and the fluid paint overspray deposited thereon, being detached from the filter surfaces, so the filter surfaces are returned to their cleaned original state.

The cleaned mixture of auxiliary filter material and fluid paint overspray drops down into the auxiliary filter material receiving container 142, whence it arrives in the raw gas flow 104 and is carried by the latter to the filter elements 122 again.

When the fraction of paint overspray in the mixture in the auxiliary filter material receiving container 142 has reached an upper threshold value, the mixture of auxiliary filter material and paint overspray is extracted by suction from the auxiliary filter material receiving container 142 and replaced by fresh auxiliary filter material.

As can best be seen from FIGS. 2 and 3, a safety filter 168 is associated in each case with the clean gas chamber 124 of each filter module 102. The safety filter 168 is arranged downstream of the filter elements 122 of the filter module 102 in the flow path of the clean gas. This flow path is indicated by the arrows 169 in FIGS. 2 and 3.

The safety filter 168, in the event of a filter rupture at at least one of the filter elements 122 (in other words in the event of mechanical damage to the particular filter element 122, through which unfiltered raw gas still loaded with fluid paint overspray and with auxiliary filter material can pass from the filter element receiving space 118 to the clean side of the filter elements 122 and from there into the clean gas chamber 124), is used to carry out a filtration of the raw gas that has arrived on the clean side and to thus separate the fluid paint overspray that has arrived on the clean side and the auxiliary filter material that has arrived on the clean side from the raw gas that has arrived on the clean side, so the fluid paint overspray and the auxiliary filter material cannot arrive in the regions of the clean gas channel 162 and the clean gas collecting channel 164, which are situated downstream of the safety filter 168, and are not able to contaminate these regions.

In particular, in the event of a filter rupture, the safety filter 168 prevents contamination of fans and sensors and of air conditioning devices (in particular of coolers and/or humidifiers) in the clean gas collecting channel 164 and in the regions of the circulating air circuit situated downstream of the clean gas collecting channel 164.

In the embodiment shown in FIGS. 1 to 3, the safety filter 168 is permanently integrated in the flow path 169 of the clean gas flow, so there is a flow through the safety filter 168 in normal operation of the device 100 to separate fluid paint overspray from the clean gas flow and the clean gas flow is filtered again by the safety filter 168.

In this embodiment, the safety filter 168 may, for example, comprise one or more pocket filters.

These may, for example, be F5 pocket filters, which have a filter efficiency of 40% to 60% in the case of particles with a diameter of 0.4 µm.

Each pocket filter may, for example, have a flow surface in the order of magnitude of about 600 mm×600 mm.

As an alternative to a pocket filter, a bag filter, a mat filter, a plate filter and/or a tube filter may also be used.

Basically, any type of filter is suitable, which withstands the volume flow guided through the safety filter 168.

Dry filters are preferably used, in other words filters of the type with which a dry filtration is configured to be carried out, in other words a filtration of the gas flow passing through the filter, which takes place without washing with a cleaning liquid.

A dry filtration of this type provides the advantage that the temperature and the humidity of the gas flow, which flows through the filter, remains at least approximately constant, so the gas flow passing through the filter does not have to be additionally conditioned with respect to its temperature and/or its humidity after passing through the filter.

The safety filter 168 may also comprise simple baffle plates, over the baffle of which, the product to be filtered (in particular fluid paint overspray and auxiliary filter material) can be deposited.

The safety filter 168 may basically be positioned in every conceivable position downstream of the filter element receiver 156.

In particular, the safety filter 168 may be arranged in the interior 152 of the clean gas chamber 124, above the clean gas chamber 124, under the clean gas chamber 124 or in the horizontal direction laterally next to the clean gas chamber 124.

The safety filter 168 is preferably arranged on one or more walls of the clean gas chamber 124.

In the embodiment shown in FIG. 1, the safety filter 168 is arranged on a base wall 170 of the clean gas chamber 124.

In this embodiment, the base wall 170 of the clean gas chamber 124 has a respective receiving opening for each safety filter element 172 of the safety filter 168, in which receiving opening the relevant safety filter element 172 is suspended with a frame 174 encircling the safety filter element 172 in such a way that the frame 174 rests on an inside of the base wall 170 of the clean gas chamber 124 facing the interior 152 of the clean gas chamber 124 and the safety filter element 172 extends through the receiving opening into the region of the clean gas channel 162 adjoining the clean gas chamber 124.

In the embodiment shown in FIG. 1, each of the safety filter elements 172 is configured as a pocket filter 176, which comprises a filter material 178 folded in a concertina-like manner, which is fixed at its upper edges to the frame 174 of the respective pocket filter 176.

The safety filter elements 172 may easily be lifted vertically upwardly from the respective associated receiving opening and removed from the clean gas chamber 124 through a maintenance opening 180 in order to be exchanged for another safety filter element 172, which will be necessary, in particular, when the relevant safety filter element 172 has been required in the event of a filter rupture at one of the filter elements 122 for the filtration of raw gas.

One or more maintenance openings 180 may, for example, be provided at a rear side 182 of the clean gas chamber 124 remote from the filter element receiving space 118.

During operation of the device 100 for separating fluid paint overspray, a maintenance opening 180 of this type is preferably closed by means of a cover or a door.

The filter elements 122, which form the main filter of the filter module 102, can also be removed from the filter module 102 through the maintenance opening 180.

The safety filter elements 172 are thus configured and arranged on a delimiting wall of the clean gas chamber 124, in particular on the base wall 170 thereof, in such a way that the disassembly of the filter elements 122 from the filter module 102, in particular the withdrawal of the filter elements 122 in a substantially horizontal direction through the maintenance openings 180, is not impeded by the presence of the safety filter elements 172.

In the event of a filter rupture at one of the filter elements 122, the damaged filter element 122 should be exchanged as soon as possible in order to avoid an overload of the downstream safety filter 168.

It is therefore favorable if a filter rupture of this type is detected as early as possible.

Damage to the main filter of the filter module 102 formed by the filter elements 122 may, for example, be detected by means of a particle counter 184, which is arranged downstream of the filter elements 122, for example in the interior 152 of the clean gas chamber 124 and is connected by a signal line 186 to the evaluation unit 188. A particle counter of this type responds to the overspray particles and/or the particles of the auxiliary filter material, which arrive on the clean side of the filter elements 122 in the event of a filter rupture.

As an alternative or in addition to this, damage to the main filter can be determined in that a change in the pressure loss between the raw gas side and the clean gas side of the filter elements 122 of the main filter is detected.

As shown schematically in FIG. 3, a differential pressure measurement of this type can take place, for example, by means of a first pressure sensor 190 arranged in the filter element receiving space 118 and a second pressure sensor 192 arranged downstream of the filter elements 122, for example in the interior 152 of the clean gas chamber 124.

A differential pressure measuring device 194 connected to the two pressure sensors 190 and 192 for determining the differential pressure $\Delta p_F$ across the filter elements 122 can also be connected by a signal line 196 to the evaluation unit 188.

A reduction in the pressure loss across the filter elements 122 indicates a filter rupture at at least one of the filter elements 122.

The pressure sensors 190 and 192 can also be used to detect a change in the flow resistance of the filter elements 122 during cleaning by means of the compressed air pulses of the pulsing unit 166, which also indicates a filter rupture at at least one of the filter elements 122.

Furthermore, it is also possible, as an alternative or in addition to the above-mentioned possibilities, to detect a filter rupture at at least one of the filter elements 122 in that a change in the pressure loss is detected across the safety filter 168.

An upstream pressure sensor 198 arranged upstream of the safety filter 168, for example in the interior 152 of the clean gas chamber 124, and a downstream pressure sensor 200 arranged downstream of the safety filter 168, for example in the clean gas channel 162, may be used to determine the pressure loss $\Delta p_S$ across the safety filter 168.

The upstream pressure sensor 198 and the downstream pressure sensor 200 may be connected to a differential pressure measuring device 202, which may in turn be connected by a signal line 204 to the evaluation unit 188.

In the event of a filter rupture at one of the filter elements 122 of the main filter, the differential pressure $\Delta p_S$ across the safety filter 168 increases, as fluid paint overspray and auxiliary filter material, which arrive on the clean side of the filter elements 122, are deposited on the upstream side of the safety filter 168, which increases the flow resistance of the safety filter 168.

The evaluation unit 188, on the basis of the transmitted signals of the particle counter 184, the main filter differential pressure measuring device 194 and/or the safety filter differential pressure measuring device 202, determines whether a filter rupture is present at at least one of the filter elements 122, and, in the event of a filter rupture, produces a warning signal or a warning message to the operating staff of the painting installation, who can then carry out an exchange of the faulty filter element 122.

Figure 4:
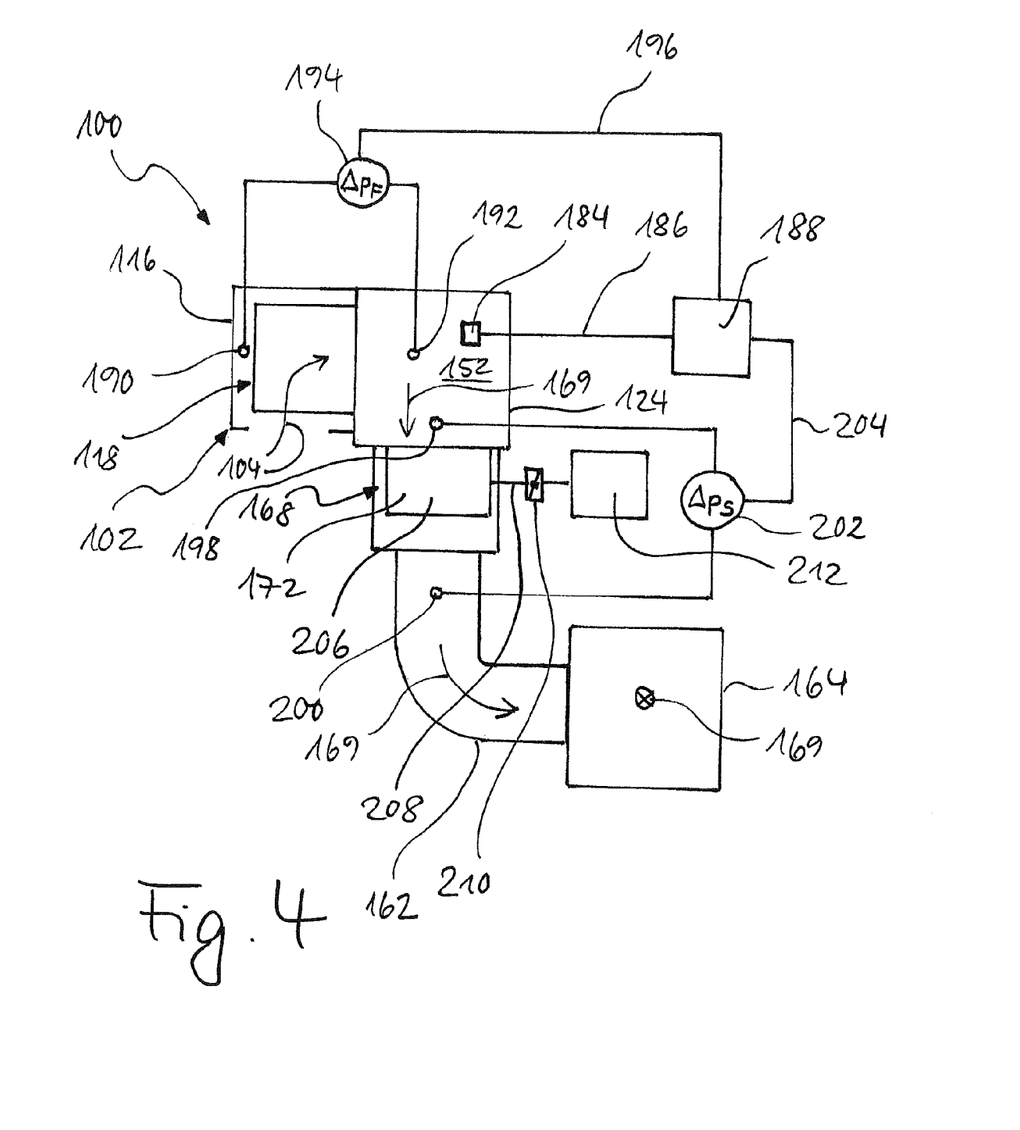
FIG. 4 shows a schematic view corresponding to FIG. 3 of a filter module with a safety filter, the safety filter containing no filter material during normal operation of the filter module and being connected to a filter material reservoir, from which a filter material is feedable to the safety filter in the event of a filter rupture at a filter element of the filter module.

A second embodiment shown in FIG. 4 of a device 100 for separating fluid paint overspray differs from the first embodiment shown in FIGS. 1 to 3 only in that the safety filter 168 in the second embodiment is not, as in the first embodiment, permanently active and does not filter the clean gas already filtered by the filter elements 122 again in the normal operating state of the filter module 102, but is only activated or switched on in the event of damage, in other words in the event of a filter rupture at at least one of the filter elements 122.

For this purpose, the safety filter 168 in this embodiment comprises at least one safety filter element 172, which in turn comprises a filter material receiver 206, which is arranged in the flow path 169 of the clean gas, but, in the normal operating state of the filter module 102, does not yet contain any filter material, so the safety filter 168 only opposes the clean gas passing through with a very small resistance in the normal operating state of the filter module 102.

The filter material receiver 206 is connected by a filter material feed line 208, which is closable by means of a flap 210, to a filter material reservoir 212, which, in the normal operating state of the filter module 102, is filled with a suitable filter material, for example with gravel, sand, iron cuttings or the like.

In the normal operating state of the filter module 102, the flap 210 is closed, so the filter material does not arrive from the filter material reservoir 212 in the filter material receiver 206.

However, if the evaluation unit 182 detects a filter rupture at at least one of the filter elements 122 of the main filter, the safety filter 168 is activated in that the flap 210 is opened (by a control device, not shown, of the device 100, for separating fluid paint overspray), whereupon filter material arrives from the filter material reservoir 212, preferably because of gravitational force, in the filter material receiver 206.

The fluid paint overspray and the auxiliary material from the raw gas that has arrived on the clean side of the filter elements 122 is then deposited on the filter material of the safety filter 168 that has arrived in the filter material receiver 206, so the safety filter 168 fulfils its filtration action.

The filter material receiver 206 may, for example, be configured as a coarse mesh net, which, in the event of a filter rupture, is filled with a fill of particulate filter material from the filter material reservoir 212.

As the safety filter 168 is only activated in this embodiment for the filtration of the gas flow when a filter rupture has been detected at at least one of the filter elements 122 of the filter module 102, the differential pressure across the safety filter 168 ($\Delta p_S$) cannot be used in this embodiment to detect a filter rupture; rather, the filter rupture has to be detected in this case by means of the particle counter 184 and/or by means of the differential pressure $\Delta p_F$ across the filter elements 122 of the main filter. Nevertheless, it may also be sensible in this embodiment to monitor the differential pressure $\Delta p_S$ across the safety filter 168 after the activation of the safety filter 168 in order to establish the respective loading of the safety filter 168 with fluid paint overspray and auxiliary filter material separated from the raw gas that has arrived on the clean side of the filter elements 122 and to be able to estimate how long the safety filter 168 can still be properly operated.

Otherwise, the second embodiment shown in FIG. 4 of a device 100 for separating fluid paint overspray coincides with respect to structure and function with the first embodiment shown in FIGS. 1 to 3, to the description of which reference is to this extent made.

Figure 5:
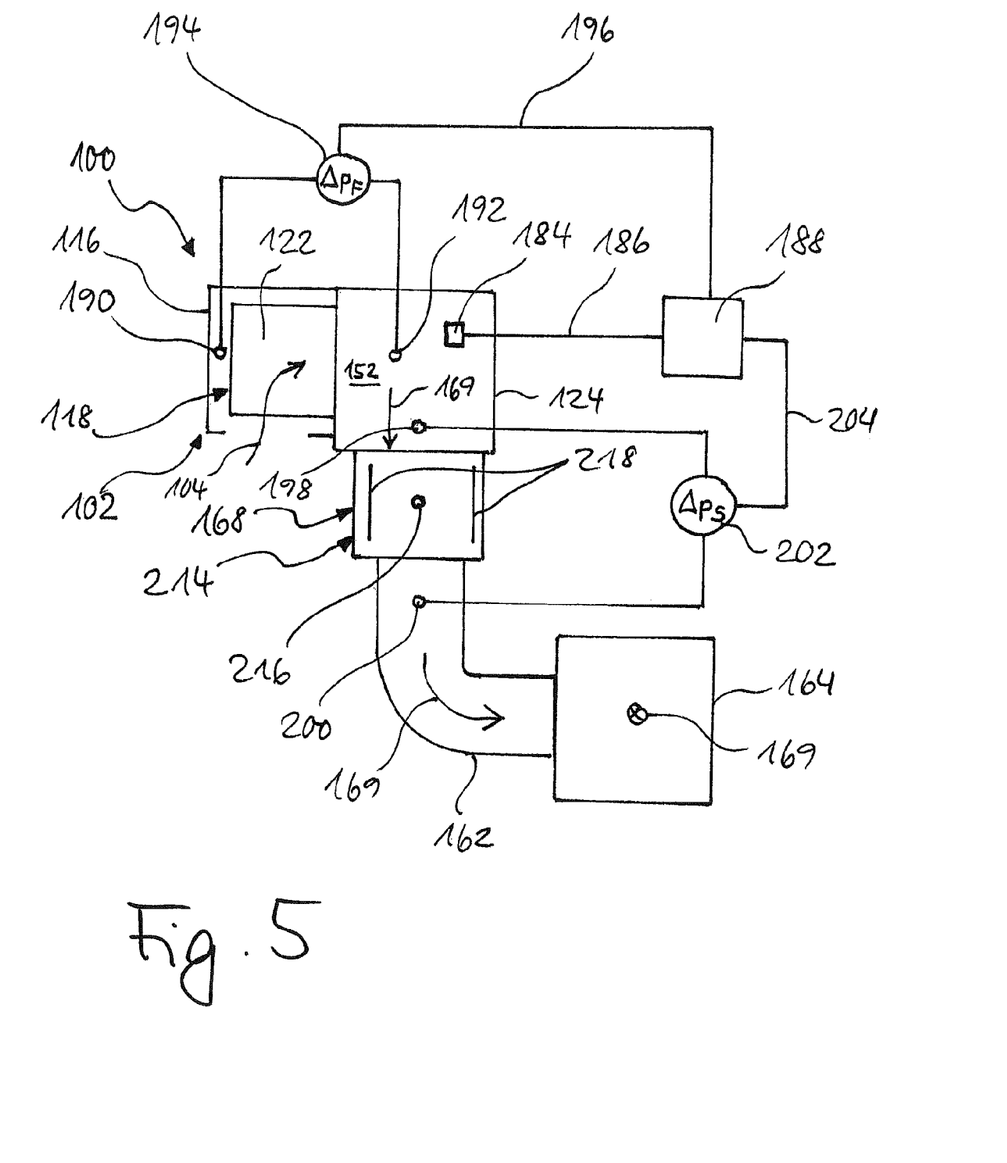
FIG. 5 shows a schematic view corresponding to FIGS. 3 and 4 of a filter module with a safety filter, the safety filter being configured as an electrostatic filter that can be switched on in the event of a filter rupture at a filter element of the filter module.

A third embodiment of a device 100 shown in FIG. 5 for separating fluid paint overspray differs from the second embodiment shown in FIG. 4 in that the safety filter 168 is not activated by filling with a filter material, but by applying an electric voltage when a filter rupture is detected at at least one of the filter elements 122 of the filter module 102.

The safety filter 168 is namely configured in this embodiment as an electrostatic filter 214, which comprises a discharge electrode 216 and one or more deposition electrodes 218.

If an electric voltage is applied between the discharge electrode 216 and the deposition electrodes 218, the dirt particles from the raw gas that has arrived on the clean side of the filter elements 122 in the electrical field of the safety filter 168 are charged counter to the polarity of the deposition electrodes 218, attracted by the deposition electrodes 218 and deposited there.

The electric voltage is applied to the electrodes of the safety filter 168 by the control device of the device 100 for separating fluid paint overspray when the evaluation unit 188 has detected a filter rupture on at least one of the filter elements 122.

In the normal operating state of the filter module 102, in which no voltage is applied to the electrodes of the safety filter 168, the safety filter 168 does not oppose the clean gas flow with substantially any contact resistance.

Otherwise, the third embodiment of a device 100 shown in FIG. 5 for separating fluid paint overspray coincides with respect to structure and function with the second embodiment shown in FIG. 4, to the above description of which reference is to this extent made.

Figure 6:
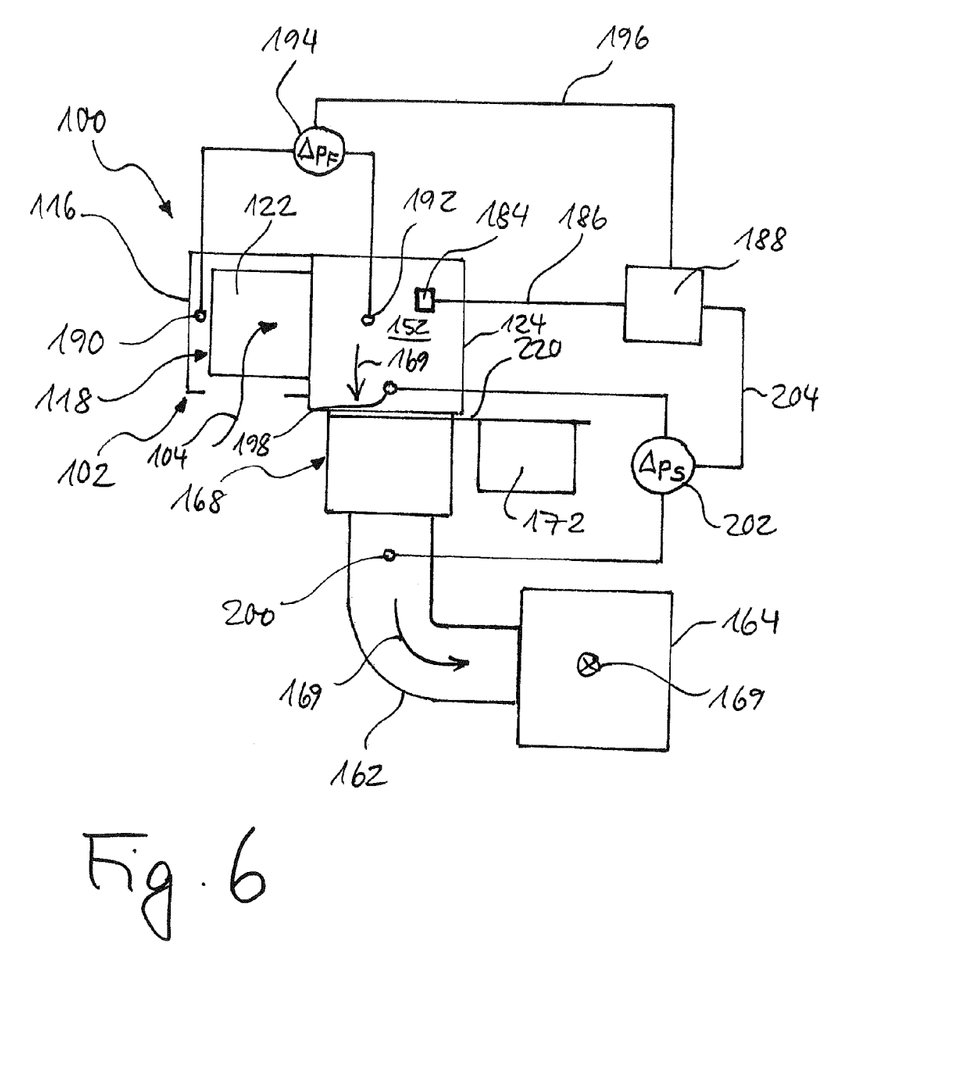
FIG. 6 shows a schematic view, corresponding to FIGS. 3 to 5 of a filter module with a safety filter, the safety filter being arranged outside the flow path of the clean gas flow during normal operation of the filter module and, in the event of a filter rupture at a filter element of the filter module, being configured to be brought by means of a movement device into the flow path of the gas flow, the safety filter being shown in a rest position, which the safety filter adopts during normal operation of the filter module.
Figure 7:
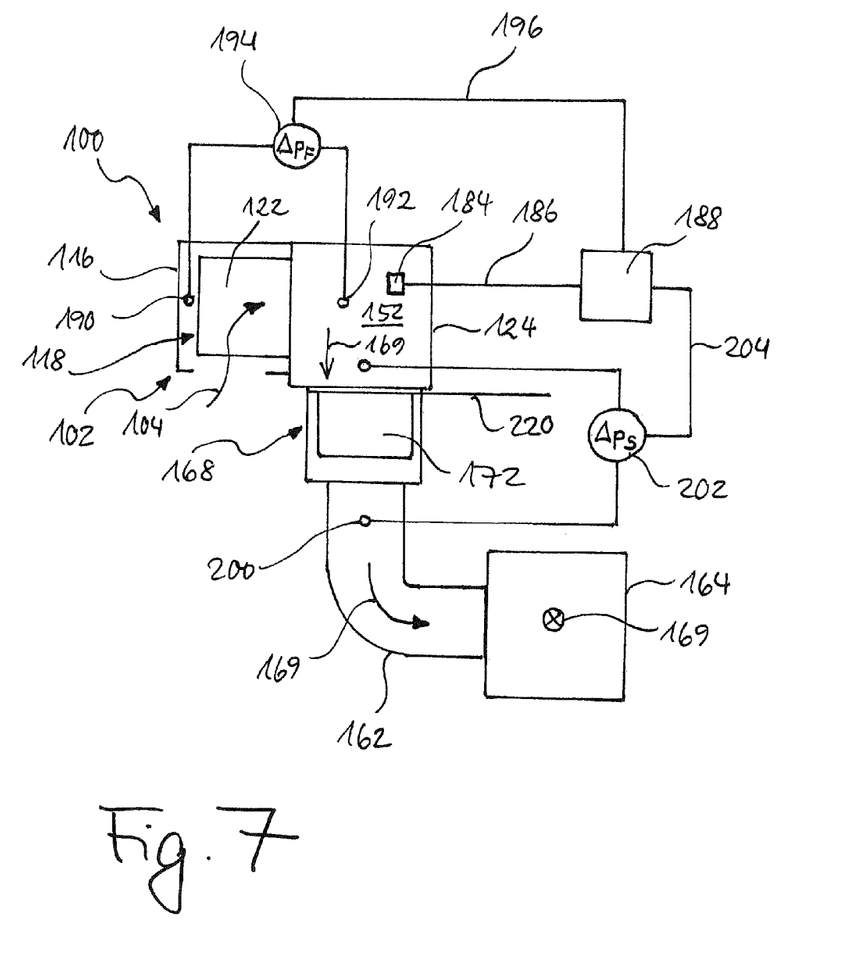
FIG. 7 shows a schematic view corresponding to FIG. 6 of the filter module with the safety filter configured to be brought into the flow path, the safety filter being shown in a working position which the safety filter adopts in the event of a filter rupture at a filter element of the filter module.

A fourth embodiment of a device 100 shown in FIGS. 6 and 7 for separating fluid paint overspray differs from the second embodiment shown in FIG. 4 in that the safety filter 168 is not activated by the pouring of filter material into a filter material receiver 206 already located in the flow path 169 of the gas flow, but rather in that one or more safety filter elements 172 are firstly introduced into the flow path 169 of the gas flow by means of a movement device 220 shown purely schematically in FIGS. 6 and 7 in the event of a filter rupture at at least one of the filter elements 122 of the filter module 102.

In the normal operating state of the filter module 102 shown in FIG. 6, one or more safety filter elements 172 are arranged outside the flow path of the clean gas flow in a standby position, so that the clean gas flow is not opposed by an increased flow resistance in the normal operating state.

If the evaluation unit 188 has detected a filter rupture at at least one of the filter elements 122, the movement device 220 is actuated by the control device of the device 100 for separating fluid paint overspray in such a way that the at least one safety filter element 172 is moved from the standby position outside the flow path 169 of the gas flow into the working position shown in FIG. 7, in which the relevant safety filter elements 172 are located in the flow path 169 of the raw gas that has arrived on the clean side of the filter elements 122 and are therefore effective for separating fluid paint overspray and auxiliary filter material from this raw gas flow.

The movable safety filter elements 172 may, for example, be configured as filter plates, pocket filters or baffle filters.

Otherwise, the fourth embodiment of a device 100 shown in FIGS. 6 and 7 for separating fluid paint overspray coincides with respect to structure and function with the second embodiment shown in FIG. 4, to the above description of which reference is to this extent made.

Since in the second to fourth embodiments of a device 100 shown in FIGS. 4 to 7 for separating fluid paint overspray the safety filter stage is only switched on when a filter rupture has been detected at at least one of the filter elements 122 of the main filter, the pressure loss is minimized by the safety filter 168 in the normal operating state of the filter module 102, the necessary safety against contamination of the clean gas side of the circulating air circuit of the painting installation nevertheless remaining ensured in the event of a filter rupture.

That which is claimed:

1. A filter device for separating paint overspray from a raw gas flow containing overspray particles, comprising at least one filter element, to which at least a part of the raw gas flow is feedable, and a clean gas chamber, to which the raw gas flow filtered by means of the filter element is feedable as a clean gas flow,
wherein at least one safety filter, which is arranged downstream of the at least one filter element and by means of which at least a part of the raw gas flow is filterable in the event of a filter rupture at at least one filter element, is associated with the clean gas chamber,
wherein the filter device comprises a clean gas channel, through which clean gas is feedable from the clean gas chamber to a clean gas collecting channel, the clean gas collecting channel also receiving the clean gas of at least one other filter device and the safety filter of the filter device being arranged upstream of a junction of the clean gas channel into the clean gas collecting channel,
wherein at least one filter element of the filter device, during operation of the filter device, is provided with a barrier layer, which contains an auxiliary filter material,
wherein the clean gas chamber comprises a base wall having a receiving opening,
wherein at least one safety filter is suspended in the receiving opening,
wherein the clean gas chamber is provided with one or more maintenance openings through which the at least one safety filter is removable from the clean gas chamber, and
wherein the maintenance opening is closed by a cover or a door during operation of the filter device.

2. The filter device according to claim 1, wherein at least one safety filter is arranged within the clean gas chamber or on a delimiting wall of the clean gas chamber.

3. The filter device according to claim 1, wherein at least one filter element is held on the clean gas chamber.

4. The filter device according to claim 1, wherein at least one safety filter is arranged on the filter device in such a way that at least one filter element is removable from the filter device, without removing the safety filter beforehand.

5. The filter device according to claim 1, wherein the safety filter comprises at least one dry filter.

6. The filter device according to claim 1, wherein the safety filter comprises a baffle filter, a pocket filter, a bag filter, a mat filter, a plate filter and/or a tube filter.

7. The filter device according to claim 1, wherein at least one safety filter is activatable in the event of a filter rupture at a filter element for the filtration of raw gas arriving through the filter element.

8. The filter device according to claim 7, wherein at least one safety filter element of at least one safety filter is configured to be introduced into a flow path of the raw gas in the event of a filter rupture.

9. The filter device according to claim 7, wherein at least one safety filter element of at least one safety filter is finable with filter material in the event of a filter rupture.

10. The filter device according to claim 7, wherein at least one safety filter element of at least one safety filter is activatable by applying an electric voltage in the event of a filter rupture.

11. The filter device according to claim 1, wherein the filter device comprises at least one detection device for detecting a filter rupture at a filter element.

12. The filter device according to claim 11, wherein at least one detection device comprises a particle counter, a pressure loss measuring device, a filter resistance measuring device for measuring the flow resistance of at least one filter element and/or a filter resistance measuring device for measuring the flow resistance of at least one safety filter.

13. A method for separating paint overspray from a raw gas flow containing overspray particles, comprising the following:
feeding at least a part of the raw gas flow to at least one filter element, by means of which the raw gas flow that is fed is filtered; and feeding the raw gas flow filtered by means of the filter element as a clean gas flow to a clean gas chamber;

wherein in the event of a filter rupture at at least one filter element, the raw gas flow fed to the clean gas chamber is filtered by means of a safety filter arranged downstream of the filter element and associated with the clean gas chamber, wherein the filter device comprises a clean gas channel, through which clean gas is fed from the clean gas chamber to a clean gas collecting channel, the clean gas collecting channel also receiving the clean gas of at least one other filter device and the safety filter of the filter device being arranged upstream of a junction of the clean gas channel into the clean gas collecting channel, wherein at least one filter element of the filter device, during operation of the filter device, is provided with a barrier layer, which contains an auxiliary filter material, wherein the clean gas chamber comprises a base wall having a receiving opening, wherein at least one safety filter is suspended in the receiving opening, wherein the clean gas chamber is provided with one or more maintenance openings through which the at least one safety filter is removable from the clean gas chamber, and wherein the maintenance opening is closed by a cover or a door during operation of the filter device.

14. A filter device for separating paint overspray from a raw gas flow containing overspray particles, comprising at least one filter element, to which at least a part of the raw gas flow is feedable, and a clean gas chamber, to which the raw gas flow filtered by means of the filter element is feedable as a clean gas flow, wherein at least one safety filter, which is arranged downstream of the at least one filter element and by means of which at least a part of the raw gas flow is filterable in the event of a filter rupture at at least one filter element, is associated with the clean gas chamber, wherein the filter device comprises a clean gas channel, through which clean gas is feedable from the clean gas chamber to a clean gas collecting channel, the clean gas collecting channel also receiving the clean gas of at least one other filter device and the safety filter of the filter device being arranged upstream of a junction of the clean gas channel into the clean gas collecting channel, wherein at least one filter element of the filter device, during operation of the filter device, is provided with a barrier layer, which contains an auxiliary filter material, wherein the filter device comprises at least one detection device for detecting a filter rupture at a filter element, said detection device comprising a particle counter, a pressure loss measuring device for measuring a pressure loss across the at least one filter element and/or a flow resistance measuring device for measuring a flow resistance of the at least one filter element, and wherein at least one safety filter is activated for the filtration of raw gas arriving through the filter element if a filter rupture is detected at the filter element.

* * * * *